(12) United States Patent      (10) Patent No.:     US 12,608,406 B2
 Golov                               (45) Date of Patent:      *Apr. 21, 2026

(54) DETERMINING AUTONOMOUS VEHICLE STATUS BASED ON MAPPING OF CROWDSOURCED OBJECT DATA

(71) Applicant: Lodestar Licensing Group LLC, Burlingame, CA (US)

(72) Inventor: Gil Golov, Backnang (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/470,341

(22) Filed: Sep. 19, 2023

(65) Prior Publication Data

US 2024/0005667 A1      Jan. 4, 2024

Related U.S. Application Data

(63) Continuation of application No. 17/216,351, filed on Mar. 29, 2021, now Pat. No. 11,861,913, which is a
(Continued)

(51) Int. Cl.
 *G06F 16/29*       (2019.01)
 *G01C 21/30*       (2006.01)
 (Continued)

(52) U.S. Cl.
 CPC ............. *G06F 16/29* (2019.01); *G01C 21/30* (2013.01); *G01C 21/3602* (2013.01);
 (Continued)

(58) Field of Classification Search
 CPC ...... G06V 20/56; G06V 20/58; G06V 20/582; G06V 20/584; G06V 20/588; G01C 21/30; G01C 21/3602; G01C 21/3614;

G05D 1/0088; G05D 1/246; G05D 1/2462; G05D 1/81; G06F 16/29; G06N 3/02; G06N 20/00; G06N 3/0481; G06N 3/08

See application file for complete search history.

(56) References Cited

U.S. PATENT DOCUMENTS 6,023,653 A  *  2/2000  Ichimura ................ G01C 21/30
                                                        701/466
8,185,296 B2      5/2012  Yokoyama et al.
                 (Continued)

FOREIGN PATENT DOCUMENTS

JP       2016095831 A  *  5/2016  ........ B60W 50/0098
WO       2018015811        1/2018

OTHER PUBLICATIONS

Translation of JP-2016095831-A, 22 pages (Year: 2016).*
International Search Report and Written Opinion, PCT/US2019/025112, mailed Jul. 19, 2019.

*Primary Examiner* — Dale W Hilgendorf

(57)               ABSTRACT

A map in a cloud service stores physical objects previously detected by other vehicles that have previously traveled over the same road that a current vehicle is presently traveling on. New data received by the cloud service from the current vehicle regarding new objects that are being encountered by the current vehicle can be compared to the previous object data stored in the map. Based on this comparison, an operating status of the current vehicle is determined. In response to determining the status, an action such as terminating an autonomous navigation mode of the current vehicle is performed.

20 Claims, 8 Drawing Sheets

Related U.S. Application Data continuation of application No. 15/951,087, filed on Apr. 11, 2018, now Pat. No. 10,997,429.

(51) Int. Cl.

| | |
|---|---|
| *G01C 21/36* | (2006.01) |
| *G05D 1/00* | (2024.01) |
| *G05D 1/246* | (2024.01) |
| *G05D 1/81* | (2024.01) |
| *G06N 3/02* | (2006.01) |
| *G06N 3/048* | (2023.01) |
| *G06N 3/08* | (2023.01) |
| *G06N 20/00* | (2019.01) |
| *G06V 20/56* | (2022.01) |
| *G06V 20/58* | (2022.01) |

(52) U.S. Cl.
CPC ....... *G01C 21/3614* (2013.01); *G05D 1/0088* (2013.01); *G05D 1/246* (2024.01); *G05D 1/2462* (2024.01); *G05D 1/81* (2024.01); *G06V 20/56* (2022.01); *G06V 20/58* (2022.01); *G06V 20/582* (2022.01); *G06V 20/584* (2022.01); *G06V 20/588* (2022.01); *G06N 3/02* (2013.01); *G06N 3/048* (2023.01); *G06N 3/08* (2013.01); *G06N 20/00* (2019.01)

(56) References Cited

U.S. PATENT DOCUMENTS

| | | | | |
|---|---|---|---|---|
| 8,442,791 | B2* | 5/2013 | Stahlin | H04L 67/12 |
| | | | | 701/445 |
| 8,457,827 | B1 | 6/2013 | Ferguson et al. | |
| 8,543,320 | B2 | 9/2013 | Zheng et al. | |
| 8,688,369 | B2 | 4/2014 | Denaro | |
| 8,825,371 | B2* | 9/2014 | Prokhorov | G01C 21/005 |
| | | | | 701/300 |
| 9,043,127 | B2 | 5/2015 | Denaro | |
| 9,062,977 | B2* | 6/2015 | Prokhorov | G01C 21/005 |
| 9,104,535 | B1 | 8/2015 | Brinkmann et al. | |
| 9,185,526 | B2 | 11/2015 | Guba et al. | |
| 9,221,461 | B2 | 12/2015 | Ferguson et al. | |
| 9,279,688 | B2 | 3/2016 | Denaro | |
| 9,296,299 | B2 | 3/2016 | Ricci | |
| 9,311,271 | B2 | 4/2016 | Wright | |
| 9,754,501 | B2 | 9/2017 | Stenneth | |
| 9,786,172 | B2 | 10/2017 | Takahara et al. | |
| 9,797,735 | B2 | 10/2017 | Denaro | |
| 9,805,601 | B1 | 10/2017 | Fields et al. | |
| 9,961,551 | B2 | 5/2018 | Scholl et al. | |
| 10,031,523 | B2 | 7/2018 | Ricci et al. | |
| 10,046,328 | B2 | 8/2018 | Nakayama et al. | |
| 10,049,328 | B2 | 8/2018 | Jiang et al. | |
| 10,068,477 | B2 | 9/2018 | Miller et al. | |
| 10,099,697 | B2 | 10/2018 | Tatourian et al. | |
| 10,139,831 | B2 | 11/2018 | Yan | |
| 10,163,274 | B1 | 12/2018 | Brinkmann et al. | |
| 10,179,586 | B2 | 1/2019 | Johnson | |
| 10,215,571 | B2* | 2/2019 | Ghadiok | G01C 21/30 |
| 10,223,380 | B2* | 3/2019 | Giurgiu | G06F 16/23 |
| 10,257,270 | B2 | 4/2019 | Cohn et al. | |
| 10,269,242 | B2 | 4/2019 | Ahmad et al. | |
| 10,298,741 | B2 | 5/2019 | Goren et al. | |
| 10,311,728 | B2 | 6/2019 | Stenneth et al. | |
| 10,331,141 | B2 | 6/2019 | Grimm et al. | |
| 10,345,110 | B2 | 7/2019 | Westover et al. | |
| 10,449,967 | B1 | 10/2019 | Ferguson | |
| 10,460,394 | B2 | 10/2019 | Perl et al. | |
| 10,493,994 | B1 | 12/2019 | Fields | |
| 10,518,720 | B2 | 12/2019 | Haque | |
| 10,529,231 | B2 | 1/2020 | Scofield | |
| 10,540,892 | B1 | 1/2020 | Fields et al. | |
| 10,543,853 | B2 | 1/2020 | Toyoda et al. | |
| 10,642,278 | B2 | 5/2020 | Matsui et al. | |
| 10,648,818 | B2* | 5/2020 | Denaro | G09B 29/007 |
| 10,755,111 | B2 | 8/2020 | Golov et al. | |
| 10,777,024 | B1 | 9/2020 | Brinkmann et al. | |
| 10,807,592 | B2 | 10/2020 | Golov | |
| 10,894,545 | B2* | 1/2021 | Bielby | G06F 8/65 |
| 10,997,429 | B2* | 5/2021 | Golov | G06V 20/588 |
| 11,004,339 | B2 | 5/2021 | Oe et al. | |
| 11,009,876 | B2 | 5/2021 | Bielby | |
| 11,072,343 | B2 | 7/2021 | Emura et al. | |
| 11,117,593 | B2 | 9/2021 | Kondo et al. | |
| 11,161,518 | B2 | 11/2021 | Golov | |
| 11,163,309 | B2* | 11/2021 | Tay | G01S 17/931 |
| 11,299,149 | B2 | 4/2022 | Yan | |
| 11,393,215 | B2 | 7/2022 | Sawada et al. | |
| 11,441,916 | B1 | 9/2022 | Konrardy et al. | |
| 11,693,408 | B2 | 7/2023 | Bielby | |
| 11,727,794 | B2 | 8/2023 | Bielby | |
| 11,836,985 | B2 | 12/2023 | Golov et al. | |
| 11,861,913 | B2* | 1/2024 | Golov | G01C 21/3602 |
| 11,866,020 | B2 | 1/2024 | Golov | |
| 12,020,488 | B2 | 6/2024 | Golov | |
| 12,246,727 | B1 | 3/2025 | Brinkmann et al. | |
| 2005/0232469 | A1* | 10/2005 | Schofield | B60Q 9/008 |
| | | | | 382/104 |
| 2007/0244631 | A1 | 10/2007 | Jung et al. | |
| 2008/0189040 | A1 | 8/2008 | Nasu et al. | |
| 2009/0228204 | A1 | 9/2009 | Zavoli et al. | |
| 2009/0234552 | A1 | 9/2009 | Takeda et al. | |
| 2009/0265070 | A1* | 10/2009 | Okada | G01C 21/30 |
| | | | | 701/1 |
| 2010/0099353 | A1* | 4/2010 | Komori | G08G 1/096791 |
| | | | | 455/39 |
| 2011/0153532 | A1 | 6/2011 | Kuge et al. | |
| 2011/0302214 | A1* | 12/2011 | Frye | G06F 16/583 |
| | | | | 707/802 |
| 2012/0109517 | A1* | 5/2012 | Watanabe | G01C 21/30 |
| | | | | 342/357.23 |
| 2012/0296560 | A1 | 11/2012 | Zheng et al. | |
| 2013/0054049 | A1 | 2/2013 | Uno | |
| 2014/0067187 | A1 | 3/2014 | Ferguson et al. | |
| 2014/0172290 | A1* | 6/2014 | Prokhorov | G01C 21/28 |
| | | | | 701/408 |
| 2014/0195214 | A1 | 7/2014 | Kozloski et al. | |
| 2014/0324336 | A1* | 10/2014 | Prokhorov | G01C 21/3602 |
| | | | | 701/445 |
| 2014/0358414 | A1* | 12/2014 | Ibrahim | G01C 21/10 |
| | | | | 701/119 |
| 2015/0039365 | A1 | 2/2015 | Haque | |
| 2015/0057838 | A1 | 2/2015 | Scholl et al. | |
| 2015/0112512 | A1 | 4/2015 | Fan et al. | |
| 2015/0178578 | A1 | 6/2015 | Hampiholi | |
| 2015/0191178 | A1 | 7/2015 | Roy et al. | |
| 2016/0150070 | A1 | 5/2016 | Goren et al. | |
| 2016/0171521 | A1 | 6/2016 | Ramirez et al. | |
| 2016/0176440 | A1 | 6/2016 | Witte et al. | |
| 2016/0209841 | A1 | 7/2016 | Yamaoka et al. | |
| 2016/0229404 | A1 | 8/2016 | Byun | |
| 2016/0251081 | A1 | 9/2016 | Staskevich et al. | |
| 2016/0280224 | A1 | 9/2016 | Tatourian et al. | |
| 2016/0351050 | A1 | 12/2016 | Takahara et al. | |
| 2016/0358477 | A1 | 12/2016 | Ansari | |
| 2016/0363935 | A1 | 12/2016 | Shuster et al. | |
| 2017/0015318 | A1 | 1/2017 | Scofield et al. | |
| 2017/0032673 | A1 | 2/2017 | Scofield et al. | |
| 2017/0039890 | A1 | 2/2017 | Truong et al. | |
| 2017/0108870 | A1 | 4/2017 | Miller et al. | |
| 2017/0124476 | A1 | 5/2017 | Levinson et al. | |
| 2017/0217433 | A1 | 8/2017 | Halder et al. | |
| 2017/0232974 | A1* | 8/2017 | Nishida | B60W 60/0053 |
| | | | | 701/24 |
| 2017/0277716 | A1* | 9/2017 | Giurgiu | G01C 21/3841 |
| 2017/0301220 | A1 | 10/2017 | Jarrell et al. | |
| 2017/0310747 | A1 | 10/2017 | Cohn et al. | |
| 2017/0316691 | A1 | 11/2017 | Miller et al. | |
| 2017/0323179 | A1 | 11/2017 | Vallespi-gonzalez | |
| 2017/0351266 | A1 | 12/2017 | Nickolaou | |
| 2017/0372431 | A1 | 12/2017 | Perl et al. | |
| 2018/0004223 | A1* | 1/2018 | Baldwin | B60W 30/18163 |

(56) References Cited

U.S. PATENT DOCUMENTS

| | | | |
|---|---|---|---|
| 2018/0018869 | A1 | 1/2018 | Ahmad et al. |
| 2018/0038698 | A1* | 2/2018 | Denaro .................. G06F 16/29 |
| 2018/0045519 | A1 | 2/2018 | Ghadiok et al. |
| 2018/0047285 | A1* | 2/2018 | Johnson ................. G08G 1/165 |
| 2018/0050800 | A1 | 2/2018 | Boykin et al. |
| 2018/0075309 | A1 | 3/2018 | Sathyanarayana et al. |
| 2018/0093676 | A1 | 4/2018 | Emura et al. |
| 2018/0105186 | A1 | 4/2018 | Motomura et al. |
| 2018/0107942 | A1 | 4/2018 | Jiang et al. |
| 2018/0204459 | A1 | 7/2018 | Bradley et al. |
| 2018/0238702 | A1 | 8/2018 | Liebinger et al. |
| 2018/0257643 | A1 | 9/2018 | Kroop et al. |
| 2018/0259968 | A1* | 9/2018 | Frazzoli ................. G06V 20/58 |
| 2018/0293466 | A1* | 10/2018 | Viswanathan ........... G06N 3/09 |
| 2018/0335785 | A1 | 11/2018 | Miller et al. |
| 2018/0349802 | A1 | 12/2018 | Jiang et al. |
| 2019/0009794 | A1 | 1/2019 | Toyoda et al. |
| 2019/0047584 | A1 | 2/2019 | Donnelly |
| 2019/0049257 | A1 | 2/2019 | Westover et al. |
| 2019/0049262 | A1 | 2/2019 | Grimm et al. |
| 2019/0051172 | A1 | 2/2019 | Stenneth et al. |
| 2019/0064843 | A1 | 2/2019 | Matsui et al. |
| 2019/0077413 | A1 | 3/2019 | Kondo et al. |
| 2019/0088132 | A1 | 3/2019 | Riggins et al. |
| 2019/0102840 | A1 | 4/2019 | Perl et al. |
| 2019/0108752 | A1 | 4/2019 | Oe et al. |
| 2019/0147252 | A1 | 5/2019 | Sawada et al. |
| 2019/0164018 | A1 | 5/2019 | Zhu et al. |
| 2019/0168772 | A1 | 6/2019 | Emura et al. |
| 2019/0170519 | A1* | 6/2019 | Anwar ............... G01C 21/3841 |
| 2019/0196481 | A1* | 6/2019 | Tay ......................... G01S 17/86 |
| 2019/0205765 | A1* | 7/2019 | Mondello ............ G05D 1/0223 |
| 2019/0236379 | A1* | 8/2019 | Golov .................... G06V 20/58 |
| 2019/0286133 | A1 | 9/2019 | Bielby |
| 2019/0287392 | A1 | 9/2019 | Bielby |
| 2019/0300017 | A1 | 10/2019 | Glaser et al. |
| 2019/0316913 | A1 | 10/2019 | Golov |
| 2019/0382004 | A1 | 12/2019 | Golov |
| 2019/0382029 | A1 | 12/2019 | Golov |
| 2019/0391576 | A1 | 12/2019 | Zhang et al. |
| 2020/0018604 | A1* | 1/2020 | Zhang .................. G06V 20/582 |
| 2020/0018605 | A1* | 1/2020 | Kusano .................. G06V 20/56 |
| 2020/0023839 | A1 | 1/2020 | Yan |
| 2020/0039508 | A1 | 2/2020 | Onishi |
| 2020/0135021 | A1 | 4/2020 | Akachi |
| 2020/0135032 | A1 | 4/2020 | Switkes et al. |
| 2020/0172112 | A1 | 6/2020 | Kawashima |
| 2020/0202560 | A1* | 6/2020 | Viswanathan ....... G06V 10/764 |
| 2020/0217667 | A1* | 7/2020 | Kim .......................... G06T 7/73 |
| 2020/0226794 | A1* | 7/2020 | Sugio ...................... G01S 17/06 |
| 2020/0263996 | A1* | 8/2020 | Gokhale ................. G01S 17/89 |
| 2020/0342241 | A1 | 10/2020 | Tiziani |
| 2020/0356108 | A1* | 11/2020 | Toma ..................... G06V 20/56 |
| 2020/0361480 | A1 | 11/2020 | Rodriguez Bravo et al. |
| 2020/0387722 | A1 | 12/2020 | Golov et al. |
| 2021/0004622 | A1 | 1/2021 | We |
| 2021/0053580 | A1 | 2/2021 | Horiguchi et al. |
| 2021/0070286 | A1 | 3/2021 | Green et al. |
| 2021/0216790 | A1 | 7/2021 | Golov |
| 2021/0221385 | A1 | 7/2021 | Jiang |
| 2021/0229674 | A1 | 7/2021 | Anikin et al. |
| 2021/0245775 | A1 | 8/2021 | Subramanian et al. |
| 2021/0271243 | A1 | 9/2021 | Bielby |
| 2021/0323565 | A1 | 10/2021 | Miyagawa |
| 2022/0024469 | A1 | 1/2022 | Golov |
| 2022/0169280 | A1 | 6/2022 | Brown et al. |
| 2022/0176989 | A1* | 6/2022 | Hwang .................. G01C 21/30 |
| 2022/0194391 | A1 | 6/2022 | Ferguson |
| 2022/0234621 | A1* | 7/2022 | Fasola .............. B60W 60/0015 |
| 2022/0242448 | A1 | 8/2022 | Chen et al. |
| 2022/0381564 | A1 | 12/2022 | Kitchen et al. |
| 2023/0041045 | A1 | 2/2023 | Golov |
| 2023/0045250 | A1 | 2/2023 | Golov |
| 2023/0341855 | A1 | 10/2023 | Bielby |
| 2023/0358568 | A1 | 11/2023 | Schuerman et al. |
| 2023/0368587 | A1 | 11/2023 | Brandmaier et al. |
| 2023/0394961 | A1 | 12/2023 | Bielby |
| 2024/0025380 | A1 | 1/2024 | Golov |
| 2024/0046653 | A1 | 2/2024 | Golov et al. |
| 2024/0051528 | A1* | 2/2024 | Tamura .................. G06T 7/246 |
| 2025/0201128 | A1 | 6/2025 | Katkoori et al. |

* cited by examiner

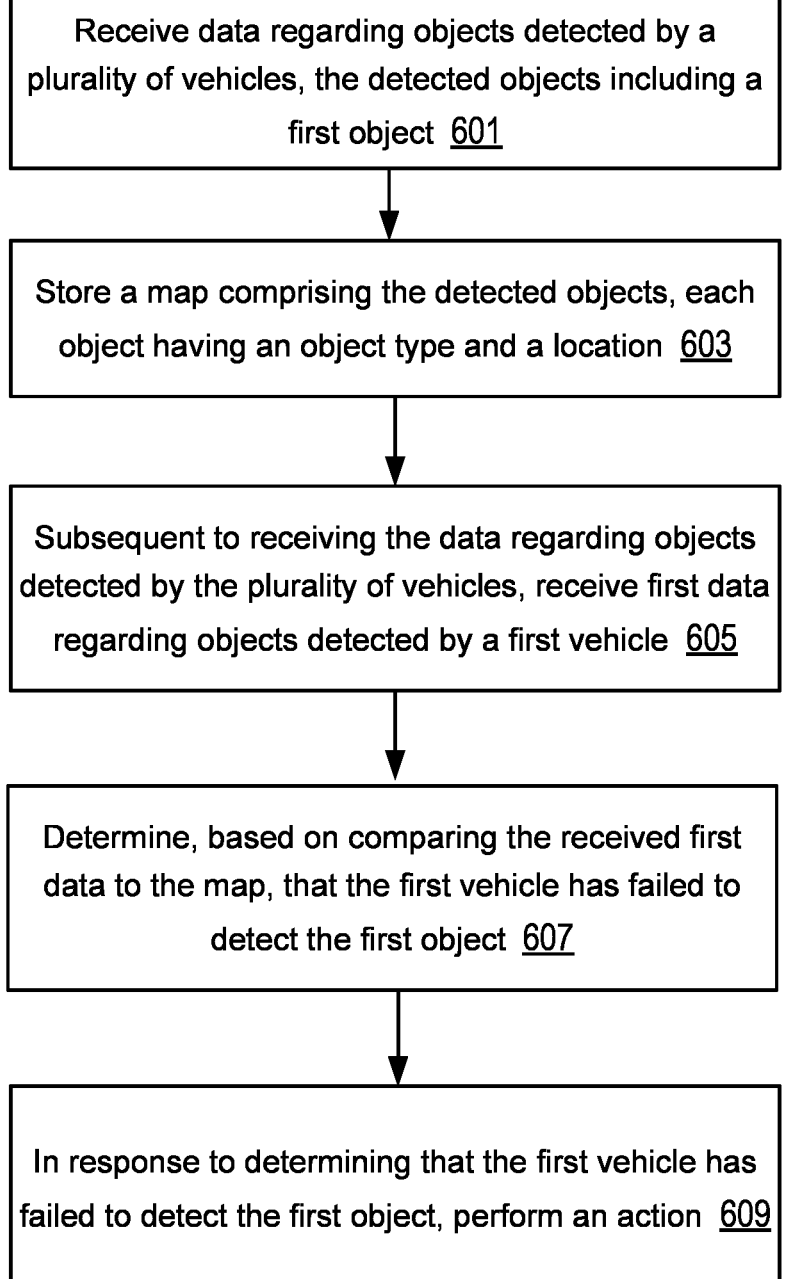

Receive data regarding objects detected by a plurality of vehicles, the detected objects including a first object 601

Store a map comprising the detected objects, each object having an object type and a location 603

Subsequent to receiving the data regarding objects detected by the plurality of vehicles, receive first data regarding objects detected by a first vehicle 605

Determine, based on comparing the received first data to the map, that the first vehicle has failed to detect the first object 607

In response to determining that the first vehicle has failed to detect the first object, perform an action 609

FIG. 3

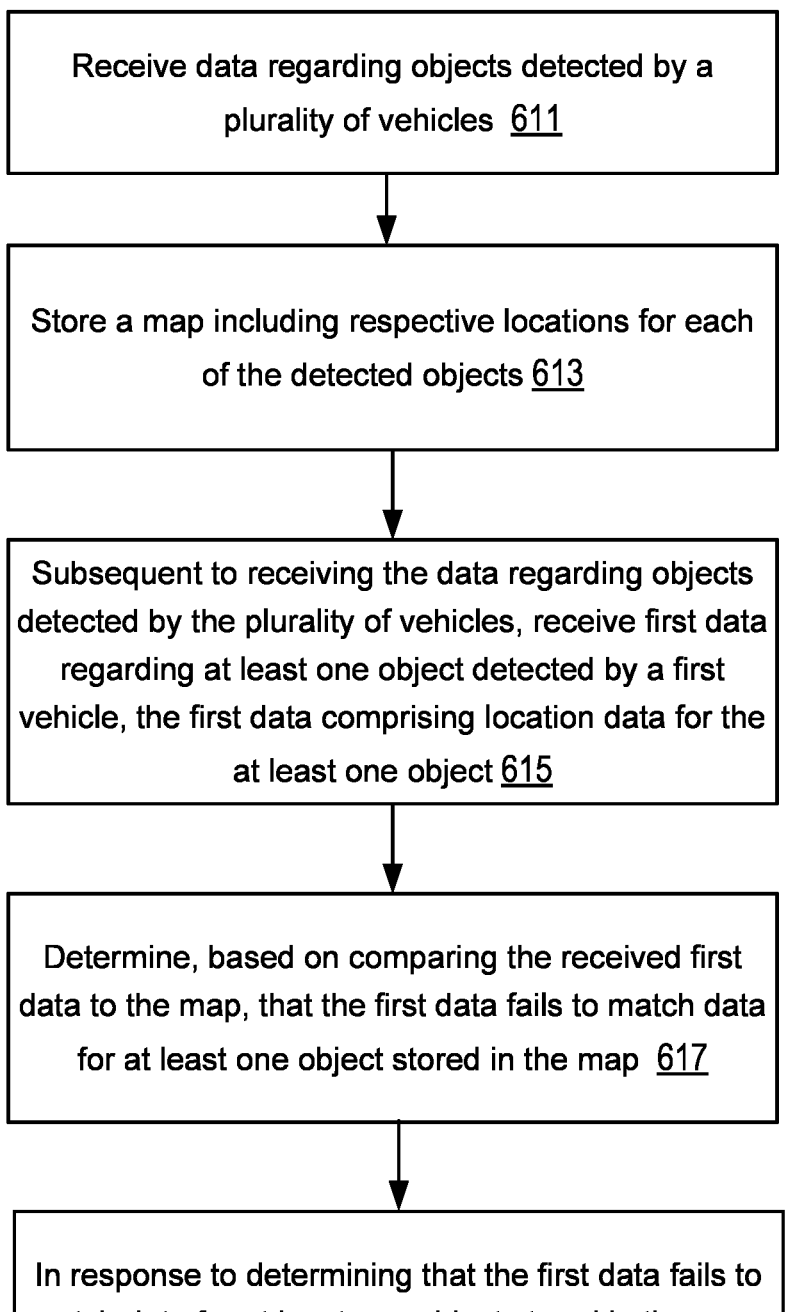

Receive data regarding objects detected by a plurality of vehicles 611

Store a map including respective locations for each of the detected objects 613

Subsequent to receiving the data regarding objects detected by the plurality of vehicles, receive first data regarding at least one object detected by a first vehicle, the first data comprising location data for the at least one object 615

Determine, based on comparing the received first data to the map, that the first data fails to match data for at least one object stored in the map 617

In response to determining that the first data fails to match data for at least one object stored in the map, perform an action 619

FIG. 4

DETERMINING AUTONOMOUS VEHICLE STATUS BASED ON MAPPING OF CROWDSOURCED OBJECT DATA

RELATED APPLICATIONS

The present application is a continuation application of U.S. patent application Ser. No. 17/216,351, filed Mar. 29, 2021, issued as U.S. Pat. No. 11,861,913 on Jan. 2, 2024, which is a continuation application of U.S. patent application Ser. No. 15/951,087, filed Apr. 11, 2018, issued as U.S. Pat. No. 10,997,429 on May 4, 2021, and entitled "Determining Autonomous Vehicle Status Based on Mapping of Crowdsourced Object Data," the entire disclosures of which applications are hereby incorporated herein by reference.

This application is related to U.S. Non-Provisional application Ser. No. 15/921,549, filed Mar. 14, 2018, issued as U.S. Pat. No. 10,894,545 on Jan. 19, 2021, entitled "Configuration of a Vehicle Based on Collected User Data," by Robert Richard Noel Bielby, the entire contents of which application is incorporated by reference as if fully set forth herein.

FIELD OF THE TECHNOLOGY

At least some embodiments disclosed herein relate to determining an operating status for vehicles in general, and more particularly, but not limited to, determining an operating status for a vehicle by comparing data regarding objects detected by the vehicle to a map of physical objects previously detected by other vehicles (e.g., a map of crowdsourced object data stored by a cloud service for which the object data was previously collected from other vehicles previously travelling over the same road as a current vehicle).

BACKGROUND

A user of a vehicle can be a driver in the case of a manually-driven vehicle. In other cases, such as for an autonomous vehicle, the user of the vehicle typically performs fewer control actions than a "driver" as regards the operation of the vehicle. For example, in some cases, the user may simply select a destination to which the vehicle travels, but without performing any directional or other control of the immediate movement of the vehicle on the roadway.

Recent developments in the technological area of autonomous driving allow a computing system to operate, at least under some conditions, control elements of a vehicle without the assistance from a user of the vehicle. For example, sensors (e.g., cameras and radars) can be installed on a vehicle to detect the conditions of the surroundings of the vehicle on a roadway. One function of these sensors is to detect objects that are encountered during travel of the vehicle.

Autonomous vehicles use a variety of sensors and artificial intelligence algorithms to detect these objects and to analyze the changing environment around the vehicle during travel. Objects that are encountered may include, for example, traffic lights, road signs, road lanes, etc. Failing to detect certain of these objects could cause an unexpected or undesired behavior of the vehicle, and in some cases could expose passengers of the vehicle and/or others outside of the vehicle (e.g., in the immediate area surrounding the vehicle) to danger.

During normal operation of a vehicle, the various sensors are used to operate the vehicle. For example, a computing system installed on the vehicle analyzes the sensor inputs to identify the conditions and generate control signals or commands for the autonomous adjustments of the direction and/or speed of the vehicle, without any input from a human operator of the vehicle. Autonomous driving and/or advanced driver assistance system (ADAS) typically involves an artificial neural network (ANN) for the identification of events and/or objects that are captured in sensor inputs.

In general, an artificial neural network (ANN) uses a network of neurons to process inputs to the network and to generate outputs from the network. Each neuron m in the network receives a set of inputs $p_k$, where $k=1, 2, \ldots, n$. In general, some of the inputs to a neuron may be the outputs of certain neurons in the network; and some of the inputs to a neuron may be the inputs to the network as a whole. The input/output relations among the neurons in the network represent the neuron connectivity in the network.

Each neuron m has a bias $b_m$, an activation function $f_m$, and a set of synaptic weights $w_{mk}$ for its inputs $p_k$ respectively, where $k=1, 2, \ldots, n$. The activation function may be in the form of a step function, a linear function, a log-sigmoid function, etc. Different neurons in the network may have different activation functions.

Each neuron m generates a weighted sum $s_m$ of its inputs and its bias, where $s_m = b_m + w_{m1} \times p_1 + w_{m2} \times p_2 + \ldots + w_{mn} \times p_n$. The output $a_m$ of the neuron m is the activation function of the weighted sum, where $a_m = f_m (s_m)$.

The relations between the input(s) and the output(s) of an ANN in general are defined by an ANN model that includes the data representing the connectivity of the neurons in the network, as well as the bias $b_m$, activation function $f_m$, and synaptic weights $w_{mk}$ of each neuron m. Using a given ANN model, a computing device computes the output(s) of the network from a given set of inputs to the network.

For example, the inputs to an ANN network may be generated based on camera inputs; and the outputs from the ANN network may be the identification of an item, such as an event or an object.

For example, U.S. Pat. App. Pub. No. 2017/0293808, entitled "Vision-Based Rain Detection using Deep Learning", discloses a method of using a camera installed on a vehicle to determine, via an ANN model, whether the vehicle is in rain or no rain weather.

For example, U.S. Pat. App. Pub. No. 2017/0242436, entitled "Road Construction Detection Systems and Methods", discloses a method of detecting road construction using an ANN model.

For example, U.S. Pat. Nos. 9,672,734 and 9,245,188 discuss techniques for lane detection for human drivers and/or autonomous vehicle driving systems.

In general, an ANN may be trained using a supervised method where the synaptic weights are adjusted to minimize or reduce the error between known outputs resulted from respective inputs and computed outputs generated from applying the inputs to the ANN. Examples of supervised learning/training methods include reinforcement learning, and learning with error correction.

Alternatively or in combination, an ANN may be trained using an unsupervised method where the exact outputs resulted from a given set of inputs is not known a priori before the completion of the training. The ANN can be trained to classify an item into a plurality of categories, or data points into clusters.

Multiple training algorithms are typically employed for a sophisticated machine learning/training paradigm.

The disclosures of the above discussed patent documents are hereby incorporated herein by reference.

BRIEF DESCRIPTION OF THE DRAWINGS

The embodiments are illustrated by way of example and not limitation in the figures of the accompanying drawings in which like references indicate similar elements.

FIG. 3 shows a method to determine an operating status of a vehicle based on object data received from prior vehicles and stored in a map, according to one embodiment.

FIG. 4 shows a method to perform an action for a vehicle based on a comparison of object data received from the vehicle with object data stored in a map, according to one embodiment.

DETAILED DESCRIPTION

Figure 1:
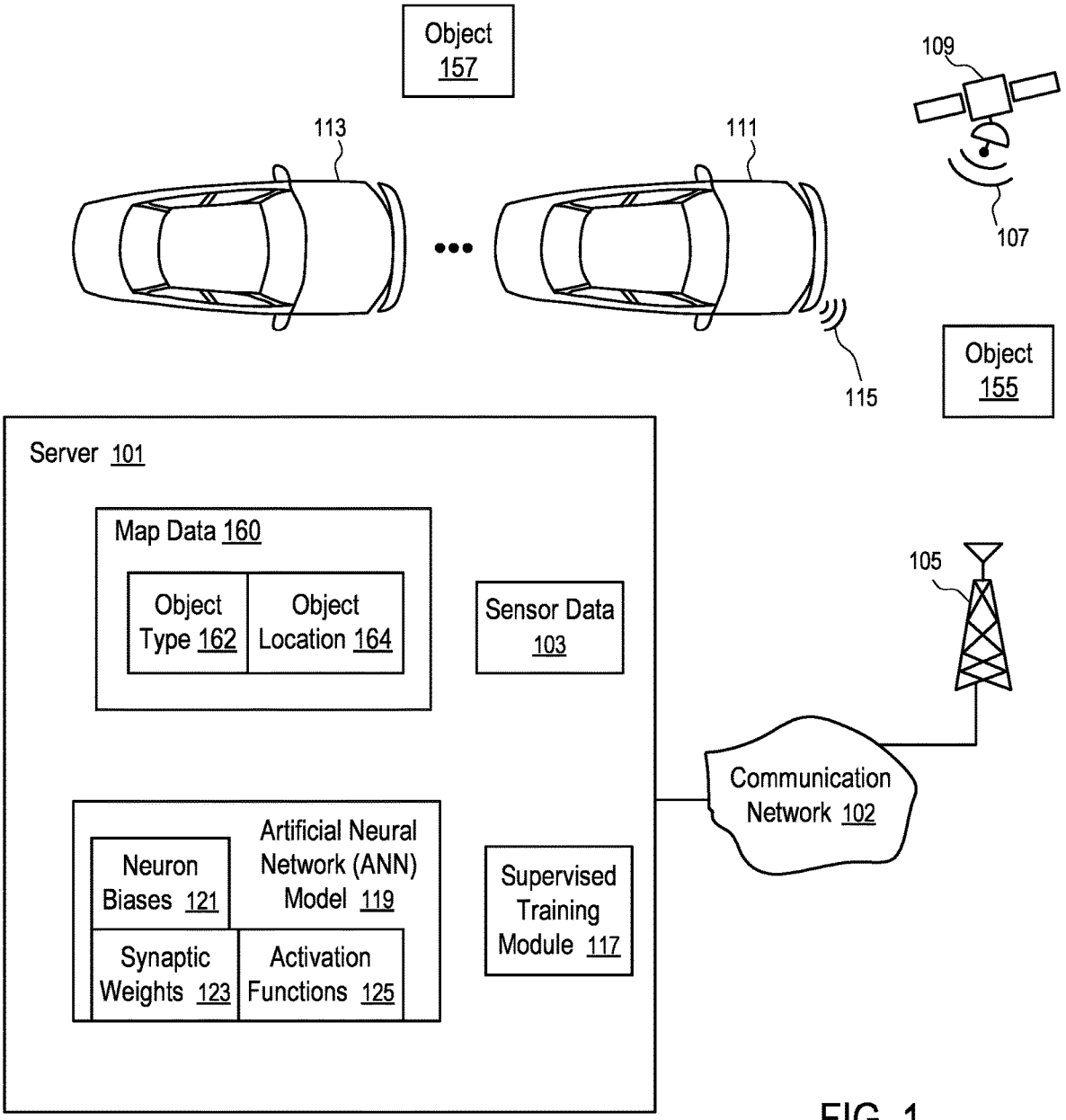
FIG. 1 illustrates a system to determine an operating status of a vehicle using a crowdsourced object map, according to one embodiment.

Currently, the technology supporting autonomous vehicles continues to improve. Improvements in digital camera technology, light detection and ranging (LIDAR), and other technologies have enabled vehicles to navigate roadways independent of drivers or with limited assistance from drivers. In some environments, such as factories, autonomous vehicles operate without any human intervention whatsoever.

While autonomous technology is primarily focused on controlling the movement of vehicles in a traditional sense, little emphasis has been placed on alternative applications that may be implemented on top of these autonomous systems. Indeed, application-level systems generally tend to reinforce existing uses of autonomous systems. For example, experimental uses of autonomous technology have been utilized to perform functions such as returning vehicles to a known location after delivering a passenger or performing refueling of vehicles while not utilized by passengers.

However, these approaches fail to fully utilize the hardware and processing power being implemented in autonomous vehicles. Thus, there currently exists a need in the state of the art of autonomous vehicles to provide additional services leveraging the existing hardware installed within such vehicles.

In particular, there is a need to solve the technical problem of determining an operating status of a vehicle, such as an autonomous vehicle, during operation. In particular, this technical problem includes the need to determine whether the various computing devices and systems of a vehicle are properly detecting objects around the vehicle during navigation and/or other operation of the vehicle. In some cases, the operating status of the vehicle needs to be determined in real-time.

At least some embodiments disclosed herein provide a technological solution to the above technical problem by using a map that stores physical objects previously detected by other vehicles (e.g., the hardware of these other vehicles is used to collect sensor data regarding objects encountered during travel). For example, these other vehicles can be vehicles that have previously traveled over the same road that a current vehicle is presently traveling on. By storing data regarding the previously-detected physical objects, new data received from the current vehicle regarding objects that are being encountered during travel can be compared to the previous object data stored in the map. Based on this comparison, an operating status of the current vehicle can be determined. The current vehicle is, for example, a manually-driven vehicle or an autonomous vehicle (e.g., a car, truck, aircraft, drone, watercraft, etc.).

For example, a map can store data regarding a stop sign detected by one or more prior vehicles. The map includes a location of the stop sign. Data received from a current vehicle traveling at or near this same location is compared to data stored in the map. In one example, based on comparing the data received from the current vehicle to the stored map data, the operating status of the current vehicle is determined. For example, it may be determined that the current vehicle is failing to navigate properly based on a failure to detect the stop sign.

In a different example, it may be determined that the current vehicle is failing to navigate properly based on a detection of the stop sign that does not properly match data that is stored in the map regarding the stop sign as collected from prior vehicles traveling on the same road. For example, the current vehicle may detect a location of the stop sign, but the newly-detected location does not match the location of the stop sign as stored in the map (e.g., does not match within a predetermined distance tolerance, such as for example, within 5-50 meters). In such a case, the current vehicle is determined as failing to operate properly (even though the object itself was detected, at least to some extent).

Various embodiments as described below are used to determine the operating status of a vehicle (e.g., a status of normal operation or abnormal operation). Data is received regarding physical objects detected by prior vehicles. A map is stored that includes locations for each of these detected objects. For example, the map can include data collected by the prior vehicles. For example, the locations of the physical objects can be based on data received from the prior vehicles. In other examples, the locations of the physical objects can be based, at least in part, on other data.

Subsequent to receiving the data regarding objects detected by the prior vehicles, new data is received regarding a new object detected by the current vehicle. The new data can include location data for the new object. The new data also may include an object type for the new object.

In one embodiment, the map is stored in a cloud storage or other service (sometimes referred to herein simply as the "cloud"). A server having access to the map determines, based on comparing the received new data to the map data, whether the current vehicle is operating properly.

For example, the server can determine based on this comparison that the newly-received data fails to match data for at least one object stored in the map. In response to this determination, the server can perform one or more actions. For example, the server can send a communication to the current vehicle. In one case, the communication can cause the current vehicle to take corrective actions, such as terminating an autonomous navigation mode.

In various embodiments, a cloud service is used to determine a health status of an autonomous vehicle based on crowdsourced objects that are stored in a map at the cloud service. More specifically, objects detected by prior vehicles (e.g., passive objects, such as traffic signs, traffic lights, etc.) are transmitted to the cloud service. The cloud service creates a dynamic map containing the type of object detected and its location (e.g., the map stores data that a stop sign is located at a position x, y). The cloud service stores the map (e.g. in a database or other data repository). Vehicles in a normal or proper operating status that pass a passive object are expected to reliably detect the object and send its position (and optionally its type) to the cloud service.

If the current vehicle fails to detect an existing object or has a false detection, this indicates an abnormal operating state of the current vehicle. In one embodiment, the cloud service determines that there is a system health issue with the current vehicle. The cloud service makes this determination by comparing the position of the current vehicle and any position data regarding the existing object that may be received from the current vehicle with data stored in the crowdsourced object map (e.g., this map was generated based on data previously received from prior vehicles that encountered the same existing object). If there is a mismatch (e.g., new and stored object location, type, and/or other data fail to match within a predetermined tolerance), then the cloud service determines that there is a system health problem with the current vehicle. If the cloud service determines that a system health problem exists, then the cloud service may determine and control one or more actions performed in response.

In one embodiment, the actions performed can include signaling the current vehicle that it has system reliability problem. In one example, a communication to the current vehicle provides data regarding how the current vehicle should respond to the determination of the system health problem. For example, in response to receiving the communication, the current vehicle can switch off its autonomous driving mode, use a backup system, and/or activate a braking system to stop the vehicle. In another example, the cloud service can send a communication to a server or other computing device that monitors an operating status for other vehicles (e.g., a central monitoring service). For example, the cloud service can send a communication to a server operated by governmental authorities. The communication can, for example, identify that the current vehicle has one or more system health issues. In some cases, in response to a determination that the current vehicle has been in an accident, the communication can be sent to the server or other computing device. In such a case, one or more indications provided to the server or other computing device can include data obtained from the current vehicle (e.g., data stored by the vehicle regarding operating functions and/or state of the vehicle prior to the accident, such as within a predetermined time period prior to the accident).

In one embodiment, the determination whether the current vehicle has been in an accident can be based on data from one or more sensors of the vehicle. For example, data from an accelerometer of the vehicle can indicate a rapid deceleration of the vehicle (e.g., deceleration exceeding a threshold). In another case, data can indicate that an emergency system of the vehicle has been activated, such as for example, an airbag, an emergency braking system, etc.

In one embodiment, a route (e.g., data for the current location of the vehicle) taken by a current vehicle being monitored is sent periodically to a cloud service. One or more sensors on the current vehicle are used to obtain data regarding objects in the environment of the current vehicle as it travels along the route. Data from the sensors and/or data generated based on analysis of sensor data and/or other data can be, for example, transmitted to the cloud service wirelessly (e.g., using a 3G, 4G, or 5G network or other radio-based communication system).

In one embodiment, in response to determining an operating status or state of a vehicle, one or more actions of the vehicle are configured. For example, an over-the-air firmware update can be sent to the vehicle for updating firmware of a computing device of the vehicle. In one example, the firmware updates a navigation system of the vehicle. The updated configuration is based at least in part on analysis of data that is collected from the vehicle.

In various other embodiments, the configuration of one or more actions performed by the vehicle may include, for example, actions related to operation of the vehicle itself and/or operation of other system components mounted in the vehicle and/or otherwise attached to the vehicle. For example, the actions may include actions implemented via controls of an infotainment system, a window status, a seat position, and/or driving style of the vehicle.

In some embodiments, the analysis of data collected by the current or prior vehicles includes providing the data as an input to a machine learning model. The current vehicle is controlled by performing one or more actions that are based on an output from the machine learning model.

In one example, a machine learning model is trained and/or otherwise used to configure a vehicle (e.g., tailor actions of the vehicle). For example, the machine learning model may be based on pattern matching in which prior patterns of sensor inputs or other data is correlated with desired characteristics or configuration(s) for operation of the vehicle.

In one embodiment, data received from the current vehicle may include sensor data collected by the vehicle during its real world services (e.g., when the user is a driver or a passenger). In one embodiment, the data is transmitted from the vehicles to a centralized server (e.g., of a cloud service), which performs machine learning/training, using a supervised method and the received sensor data and/or other data, to generate an updated ANN model that can be subsequently loaded into the vehicle to replace its previously-installed ANN model. The model is used to configure the operation of the vehicle.

In some embodiments, the driver can take over certain operations from the vehicle in response to the vehicle receiving a communication that an operating status is abnormal. One or more cameras of the vehicle, for example, can be used to collect image data that assists in implementing this action. In one example, the vehicle is configured in real-time to respond to the received object data.

FIG. 1 illustrates a system to determine an operating status of a vehicle using a crowdsourced object map, according to one embodiment. The system uses an Artificial Neural Network (ANN) model in some embodiments. The system of FIG. 1 includes a centralized server 101 in communication with a set of vehicles 111, . . . , 113 via a communications network 102.

For example, vehicle 113 can be one of a plurality of prior vehicles that has detected objects during travel. These objects can include, for example, object 155 and object 157. Sensors of vehicle 113 and the other prior vehicles collect and/or generate data regarding the objects that have been detected.

Data regarding the detected objects is sent, via communications network 102, to a computing device such as server 101 (e.g., which may be part of a cloud service). Server 101 receives the object data from vehicle 113 and the other prior vehicles. Server 101 stores a map including map data 160, which may include a number of records for each object. In one example, map data 160 includes an object type 162 and object location 164 for each object.

Subsequent to receiving the data regarding detected objects from the prior vehicles, a current vehicle 111 transmits data regarding new objects that are being detected during travel. For example, object 155 can be a new object from the perspective of vehicle 111.

Server 101 receives data regarding object 155 from vehicle 111. Server 101 determines, based on comparing the data regarding object 155 that is received from vehicle 111 to data regarding object 155 that is stored in map data 160, whether vehicle 111 has failed to properly detect at least one object. In some cases, server 101 may determine that vehicle 111 has failed to properly detect object 155. For example, even though vehicle 111 may recognize object 155 (at least to some extent), the object location data received from vehicle 111 may fail to correspond within a predetermined tolerance or threshold to the object location 164 that was previously stored in map data 160. Other types of discrepancies in received data and stored data may alternatively and/or additionally be identified.

In other cases, vehicle 111 sends its current location to server 101. The location of vehicle 111 is compared to object location 164 for object 155. Server 101 determines that vehicle 111 has failed to detect the presence of object 155. In one example, this determination may be made based on a failure of vehicle 111 to report any object data for object 155.

In response to determining that vehicle 111 has failed to detect object 155, or has failed to properly detect at least a portion of data associated with object 155, server 101 performs one or more actions. For example, server 101 can transmit a communication to vehicle 111 that causes a termination of an autonomous driving mode.

In one embodiment, sensor data 103 can be collected in addition to map data 160. Sensor data 103 can be, for example, provided by the current vehicle 111 and/or prior vehicles 113 (e.g., sensor data 103 may be for data other than object data, such as temperature, acceleration, audio, etc.). Sensor data 103 can be used in combination with map data 160 and/or other new data received from current vehicle 111 to perform an analysis of the operating status of vehicle 111. In some cases, some or all of the foregoing data can be used to train artificial neural network model 119. Additionally, in some cases, an output from artificial neural network model 119 can be used as part of making a determination that vehicle 111 has failed to properly detect object 155 and/or another object.

In some embodiments, at least a portion of map data 160 can be transmitted to vehicle 111 and a determination regarding operating status of vehicle 111 can be locally determined by a computing device mounted on or within vehicle 111. In some embodiments, artificial neural network model 119 itself and/or associated data can be transmitted to and implemented on vehicle 111 and/or other vehicles. An output from artificial neural network model 119 can be used to determine actions performed in response to determining that the vehicle has failed to properly detect an object.

In one embodiment, data from vehicle 111 is collected by sensors located in vehicle 111. The collected data is analyzed, for example, using a computer model such as an artificial neural network (ANN) model. In one embodiment, the collected data is provided as an input to the ANN model. For example, the ANN model can be executed on server 101 and/or vehicle 111. The vehicle 111 is controlled based on at least one output from the ANN model. For example, this control includes performing one or more actions based on the output. These actions can include, for example, control of steering, braking, acceleration, and/or control of other systems of vehicle 111 such as an infotainment system and/or communication device.

In one embodiment, the server 101 includes a supervised training module 117 to train, generate, and update ANN model 119 that includes neuron biases 121, synaptic weights 123, and activation functions 125 of neurons in a network used for processing collected data regarding a vehicle and/or sensor data generated in the vehicles 111, . . . , 113.

In one embodiment, once the ANN model 119 is trained and implemented (e.g., for autonomous driving and/or an advanced driver assistance system), the ANN model 119 can be deployed on one or more of vehicles 111, . . . , 113 for usage.

In various embodiments, the ANN model is trained using data as discussed above. The training can be performed on a server and/or the vehicle. Configuration for an ANN model as used in a vehicle can be updated based on the training. The training can be performed in some cases while the vehicle is being operated.

Typically, the vehicles 111, . . . , 113 have sensors, such as a visible light camera, an infrared camera, a LIDAR, a RADAR, a sonar, and/or a set of peripheral sensors. The sensors of the vehicles 111, . . . , 113 generate sensor inputs for the ANN model 119 in autonomous driving and/or advanced driver assistance system to generate operating instructions, such as steering, braking, accelerating, driving, alerts, emergency response, etc.

During the operations of the vehicles 111, . . . , 113 in their respective service environments, the vehicles 111, . . . , 113 encounter items, such as events or objects, that are captured in the sensor data. The ANN model 119 is used by the vehicles 111, . . . , 113 to provide the identifications of the items to facilitate the generation of commands for the operations of the vehicles 111, . . . , 113, such as for autonomous driving and/or for advanced driver assistance.

For example, a vehicle 111 may communicate, via a wireless connection 115 to an access point (or base station) 105, with the server 101 to submit the sensor input to enrich the sensor data 103 as an additional dataset for machine learning implemented using the supervised training module 117. The wireless connection 115 may be made via a wireless local area network, a cellular communications network, and/or a communication link 107 to a satellite 109 or a communication balloon. In one example, user data collected from a vehicle can be similarly transmitted to the server.

Optionally, the sensor input stored in the vehicle 111 may be transferred to another computer for uploading to the centralized server 101. For example, the sensor input can be transferred to another computer via a memory device, such as a Universal Serial Bus (USB) drive, and/or via a wired computer connection, a BLUETOOTH connection or WiFi connection, a diagnosis tool, etc.

Periodically, the server 101 runs the supervised training module 117 to update the ANN model 119 based on updated data that has been received. The server 101 may use the sensor data 103 enhanced with the other data based on prior operation by similar vehicles (e.g., vehicle 113) that are operated in the same geographical region or in geographical regions having similar traffic conditions (e.g., to generate a customized version of the ANN model 119 for the vehicle 111).

Optionally, the server 101 uses the sensor data 103 along with object data received from a general population of vehicles (e.g., 111, 113) to generate an updated version of the ANN model 119. The updated ANN model 119 can be downloaded to the current vehicle (e.g., vehicle 111) via the communications network 102, the access point (or base station) 105, and communication links 115 and/or 107 as an over-the-air update of the firmware/software of the vehicle.

Optionally, the vehicle 111 has a self-learning capability. After an extended period on the road, the vehicle 111 may generate a new set of synaptic weights 123, neuron biases 121, activation functions 125, and/or neuron connectivity for the ANN model 119 installed in the vehicle 111 using the sensor inputs it collected and stored in the vehicle 111. As an example, the centralized server 101 may be operated by a factory, a producer or maker of the vehicles 111, . . . , 113, or a vendor of the autonomous driving and/or advanced driver assistance system for vehicles 111, . . . , 113.

Figure 2:
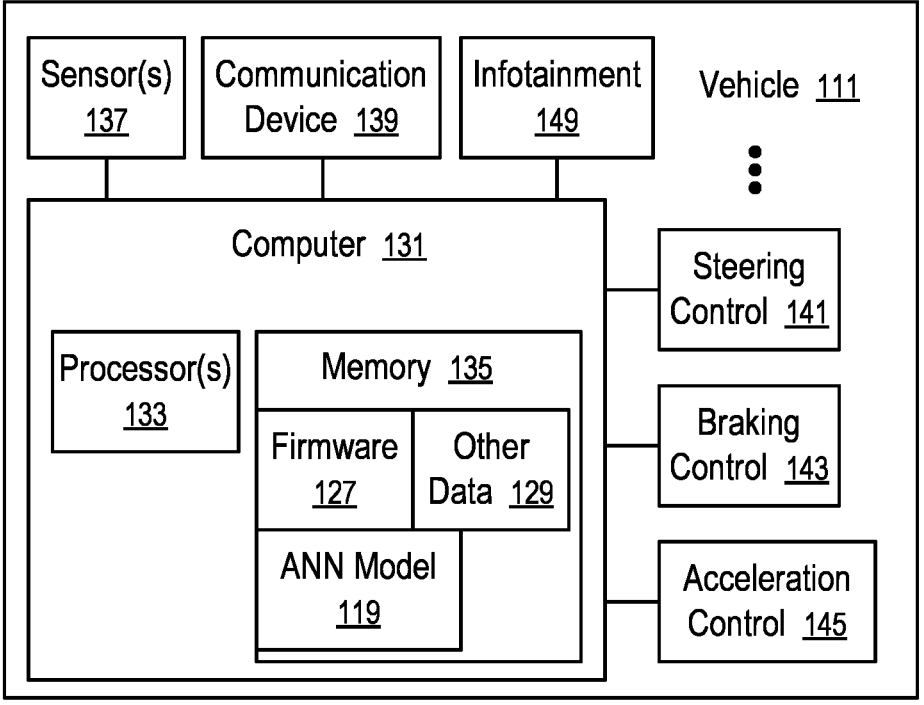
FIG. 2 shows an example of a vehicle configured using an Artificial Neural Network (ANN) model, according to one embodiment.

FIG. 2 shows an example of a vehicle configured using an Artificial Neural Network (ANN) model, according to one embodiment. The vehicle 111 of FIG. 2 includes an info-tainment system 149, a communication device 139, one or more sensors 137, and a computer 131 that is connected to some controls of the vehicle 111, such as a steering control 141 for the direction of the vehicle 111, a braking control 143 for stopping of the vehicle 111, an acceleration control 145 for the speed of the vehicle 111, etc.

The computer 131 of the vehicle 111 includes one or more processors 133, memory 135 storing firmware (or software) 127, the ANN model 119 (e.g., as illustrated in FIG. 1), and other data 129.

In one example, firmware 127 is updated by an over-the-air update in response to a determination by server 101 that vehicle 111 is failing to properly detect objects during travel. Alternatively, and/or additionally, other firmware of various computing devices or systems of vehicle 111 can be updated.

The one or more sensors 137 may include a visible light camera, an infrared camera, a LIDAR, RADAR, or sonar system, and/or peripheral sensors, which are configured to provide sensor input to the computer 131. A module of the firmware (or software) 127 executed in the processor(s) 133 applies the sensor input to an ANN defined by the model 119 to generate an output that identifies or classifies an event or object captured in the sensor input, such as an image or video clip. Data from this identification and/or classification can be included in object data sent from current vehicle 111 to server 101 to determine if an object is being properly detected.

Alternatively, and/or additionally, the identification or classification of the event or object generated by the ANN model 119 can be used by an autonomous driving module of the firmware (or software) 127, or an advanced driver assistance system, to generate a response. The response may be a command to activate and/or adjust one of the vehicle controls 141, 143, and 145. In one embodiment, the response is an action performed by the vehicle where the action has been configured based on an update command from server 101 (e.g., the update command can be generated by server

101 in response to determining that vehicle 111 is failing to properly detect objects). In one embodiment, prior to generating the control response, the vehicle is configured. In one embodiment, the configuration of the vehicle is performed by updating firmware of vehicle 111. In one embodiment, the configuration of the vehicle includes updating of the computer model stored in vehicle 111 (e.g., ANN model 119).

The server 101 stores the received sensor input as part of the sensor data 103 for the subsequent further training or updating of the ANN model 119 using the supervised training module 117. When an updated version of the ANN model 119 is available in the server 101, the vehicle 111 may use the communication device 139 to download the updated ANN model 119 for installation in the memory 135 and/or for the replacement of the previously installed ANN model 119. These actions may be performed in response to determining that vehicle 111 is failing to properly detect objects.

In one example, the outputs of the ANN model 119 can be used to control (e.g., 141, 143, 145) the acceleration of a vehicle (e.g., 111), the speed of the vehicle 111, and/or the direction of the vehicle 111, during autonomous driving or provision of advanced driver assistance.

Typically, when the ANN model is generated, at least a portion of the synaptic weights 123 of some of the neurons in the network is updated. The update may also adjust some neuron biases 121 and/or change the activation functions 125 of some neurons. In some instances, additional neurons may be added in the network. In other instances, some neurons may be removed from the network.

In one example, data obtained from a sensor of vehicle 111 may be an image that captures an object using a camera that images using lights visible to human eyes, or a camera that images using infrared lights, or a sonar, radar, or LIDAR system. In one embodiment, image data obtained from at least one sensor of vehicle 111 is part of the collected data from the current vehicle that was analyzed. In some instances, the ANN model is configured for a particular vehicle 111 based on the sensor and other collected data.

FIG. 3 shows a method to determine an operating status of a vehicle (e.g., vehicle 111) based on object data (e.g., object location and type) received from prior vehicles and stored in a map (e.g., map data 160), according to one embodiment. In block 601, data is received regarding objects detected by prior vehicles. The detected objects include a first object (e.g., a stop sign).

In block 603, a map is stored that includes the detected objects. For example, each object has an object type and a location (e.g., a geographic position).

In block 605, subsequent to receiving the data regarding objects detected by the prior vehicles, new data is received regarding one or more objects detected by a new vehicle (e.g., vehicle 111). In block 607, based on comparing the new object data from the new vehicle to data stored in the map, a determination is made that the new vehicle has failed to detect the first object.

In block 609, in response to determining that the new vehicle has failed to detect the first object, an action is performed. For example, the action can include sending at least one communication to a computing device other than the new vehicle. In one example, the computing device is a server that monitors an operating status for each of two or more vehicles.

In one embodiment, a method includes: receiving, by at least one processor, data regarding objects detected by a plurality of vehicles, the detected objects including a first object; storing, by the at least one processor, a map comprising the detected objects, each object having an object type and a location; subsequent to receiving the data regarding objects detected by the plurality of vehicles, receiving first data regarding objects detected by a first vehicle; determining, based on comparing the received first data to the map, that the first vehicle has failed to detect the first object; and in response to determining that the first vehicle has failed to detect the first object, performing an action.

In one embodiment, the first object is a traffic sign, a traffic light, a road lane, or a physical structure.

In one embodiment, the method further comprises determining a location of the first vehicle, and determining that the first vehicle has failed to detect the first object includes comparing the location of the first vehicle to the location of the first object stored in the map.

In one embodiment, the first vehicle is a vehicle other than the plurality of vehicles. In another embodiment, the first vehicle is included in the plurality of vehicles.

In one embodiment, the method further comprises analyzing the first data, wherein performing the action comprises configuring, based on analyzing the first data, at least one action performed by the first vehicle.

In one embodiment, the first vehicle is an autonomous vehicle comprising a controller and a storage device, the action comprises updating firmware of the controller, and the updated firmware is stored in the storage device.

In one embodiment, the method further comprises training a computer model using at least one of supervised or unsupervised learning, wherein the training is done using data collected from the plurality of vehicles, and wherein determining that the first vehicle has failed to detect the first object is based at least in part on an output from the computer model.

In one embodiment, the first data comprises image data obtained from at least one sensor of the first vehicle.

In one embodiment, the method further comprises analyzing the first data, wherein the first data comprises image data, and analyzing the first data comprises performing pattern recognition using the image data to determine a type of object detected by the first vehicle.

In one embodiment, the method further comprises providing the first data as an input to an artificial neural network model, and the action performed is based on an output from the artificial neural network model.

FIG. 4 shows a method to perform an action for a vehicle (e.g., vehicle 111) based on a comparison of object data received from the vehicle with object data stored in a map, according to one embodiment. In block 611, data is received regarding objects detected by prior vehicles. For example, the data is received by server 101.

In block 613, a map is stored that includes locations for each of the objects detected by the prior vehicles. For example, the stored map includes map data 160 and is stored in the cloud.

In block 615, after receiving the data regarding objects detected by the prior vehicles, data is received regarding at least one new object detected by a new vehicle. The received data includes location data for the at least one new object.

In block 617, a computing device compares the received new object data to the prior object data stored in the map. Based on this comparison, the computing device determines that the new object data fails to match the stored map data for at least one object. In block 619, in response to determining that the new object data fails to match data stored in the map, one or more actions are performed.

In one embodiment, a non-transitory computer storage medium stores instructions which, when executed on a computing device, cause the computing device to perform a method comprising: receiving data regarding objects detected by a plurality of vehicles; storing a map including respective locations for each of the detected objects; subsequent to receiving the data regarding objects detected by the plurality of vehicles, receiving first data regarding at least one object detected by a first vehicle, the first data comprising location data for the at least one object; determining, based on comparing the received first data to the map, that the first data fails to match data for at least one object stored in the map; and in response to determining that the first data fails to match data for at least one object stored in the map, performing an action.

In one embodiment, the first data comprises data obtained from an artificial neural network model of the first vehicle.

In one embodiment, a system includes: at least one processor; and memory storing instructions configured to instruct the at least one processor to: receive data regarding objects, each object detected by at least one of a plurality of vehicles, and the detected objects including a first object; store, based on the received data, a map including the detected objects, each of the detected objects associated with a respective location; receive first data regarding at least one object detected by a first vehicle; determine, based on comparing the received first data to the map, that the first vehicle has failed to detect the first object; and in response to determining that the first vehicle has failed to detect the first object, performing at least one action.

In one embodiment, performing the at least one action comprises sending a communication to the first vehicle, the communication causing the first vehicle to perform at least one of deactivating an autonomous driving mode of the first vehicle or activating a backup navigation device of the first vehicle.

In one embodiment, performing the at least one action comprises sending at least one communication to a computing device other than the first vehicle.

In one embodiment, the computing device is a server that monitors a respective operating status for each of a plurality of vehicles.

In one embodiment, the instructions are further configured to instruct the at least one processor to determine that an accident involving the first vehicle has occurred, and wherein the at least one communication to the computing device comprises data associated with operation of the first vehicle prior to the accident.

In one embodiment, the instructions are further configured to instruct the at least one processor to compare a location of an object detected by the first vehicle to a location of the first object, wherein determining that the first vehicle has failed to detect the first object is based at least in part on comparing the location of the object detected by the first vehicle to the location of the first object.

In one embodiment, the received data regarding objects detected by the plurality of vehicles includes data collected by a plurality of sensors for each of the vehicles.

In one embodiment, performing the at least one action is based on an output from a machine learning model, and wherein the machine learning model is trained using training data, the training data comprising data collected by sensors of the plurality of vehicles.

Figure 5:
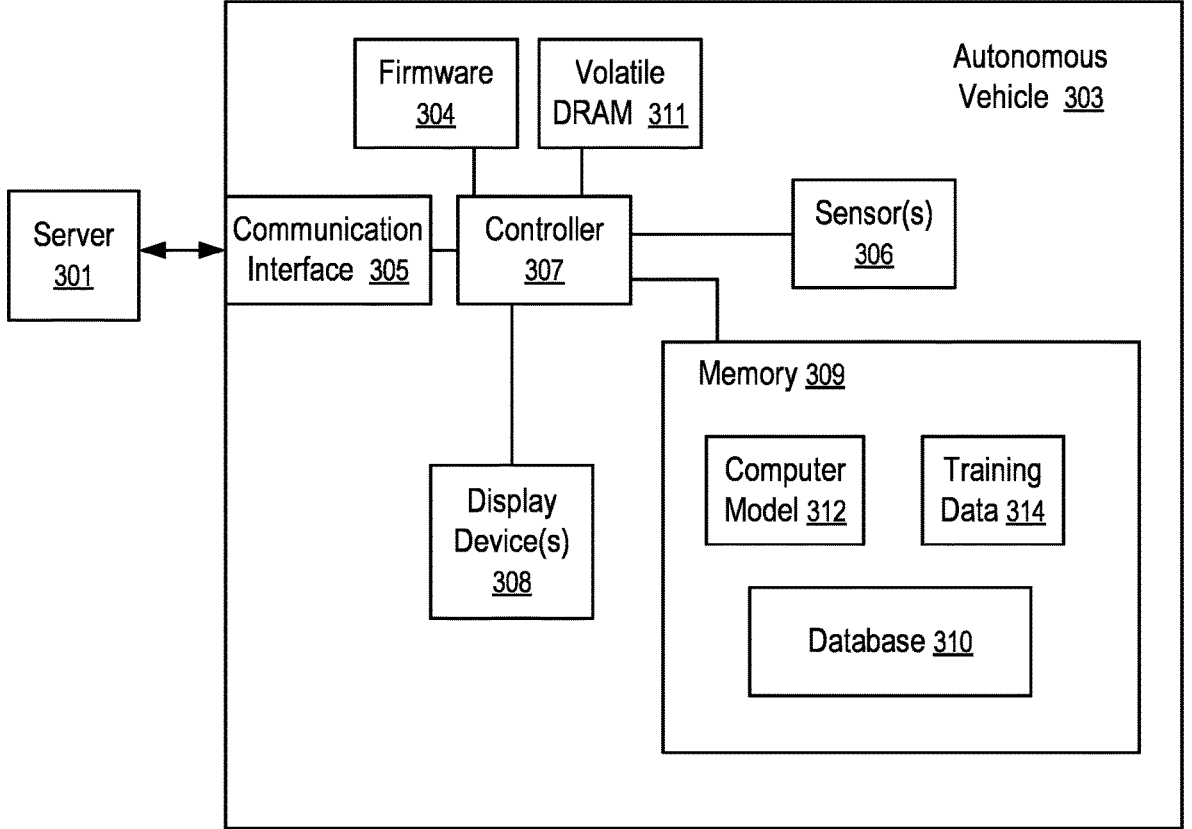
FIG. 5 shows an autonomous vehicle configured in response to determining an operating status of the vehicle, according to one embodiment.

FIG. 5 shows an autonomous vehicle 303 configured in response to determining an operating status of the vehicle, according to one embodiment. In one embodiment, a system controls a display device 308 (or other device, system, or component) of an autonomous vehicle 303. For example, a controller 307 controls the display of images on one or more display devices 308.

Server 301 may store, for example, map data 160. Server 301 may determine, using map data 160, that vehicle 303 is failing to properly detect objects. In response to this determination, server 301 may cause the controller 307 to terminate an autonomous navigation mode. Other actions can be performed in response to this determination including, for example, configuring a vehicle 303 by updating firmware 304, updating computer model 312, updating data in database 310, and/or updating training data 314.

The controller 307 may receive data collected by one or more sensors 306. The sensors 306 may be, for example, mounted in the autonomous vehicle 303. The sensors 306 may include, for example, a camera, a microphone, a motion detector, and/or a camera. At least a portion of the sensors may provide data associated with objects newly detected by vehicle 303 during travel.

The sensors 306 may provide various types of data for collection by the controller 307. For example, the collected data may include image data from the camera and/or audio data from the microphone.

In one embodiment, the controller 307 analyzes the collected data from the sensors 306. The analysis of the collected data includes providing some or all of the collected data as one or more inputs to a computer model 312. The computer model 312 can be, for example, an artificial neural network trained by deep learning. In one example, the computer model is a machine learning model that is trained using training data 314. The computer model 312 and/or the training data 314 can be stored, for example, in memory 309. An output from the computer model 312 can be transmitted to server 301 as part of object data for comparison to map data 160.

In one embodiment, memory 309 stores a database 310, which may include data collected by sensors 306 and/or data received by a communication interface 305 from computing device, such as, for example, a server 301 (server 301 can be, for example, server 101 of FIG. 1 in some embodiments). In one example, this communication may be used to wirelessly transmit collected data from the sensors 306 to the server 301. The received data may include configuration, training, and other data used to configure control of the display devices 308 by controller 307.

For example, the received data may include data collected from sensors of autonomous vehicles other than autonomous vehicle 303. This data may be included, for example, in training data 314 for training of the computer model 312. The received data may also be used to update a configuration of a machine learning model stored in memory 309 as computer model 312.

In FIG. 5, firmware 304 controls, for example, the operations of the controller 307 in controlling the display devices 308 and other components of vehicle 303. The controller 307 also can, for example, run the firmware 304 to perform operations responsive to communications from the server 301. The autonomous vehicle 303 includes volatile Dynamic Random-Access Memory (DRAM) 311 for the storage of run-time data and instructions used by the controller 307.

In one embodiment, memory 309 is implemented using various memory/storage technologies, such as NAND gate based flash memory, phase-change memory (PCM), magnetic memory (MRAM), resistive random-access memory, and 3D XPoint, such that the memory 309 is non-volatile and can retain data stored therein without power for days, months, and/or years.

In one embodiment server 301 communicates with the communication interface 305 via a communication channel. In one embodiment, the server 301 can be a computer having one or more Central Processing Units (CPUs) to which vehicles, such as the autonomous vehicle 303, may be connected using a computer network. For example, in some implementations, the communication channel between the server 301 and the communication interface 305 includes a computer network, such as a local area network, a wireless local area network, a cellular communications network, or a broadband high-speed always-connected wireless communication connection (e.g., a current or future generation of mobile network link).

In one embodiment, the controller 307 performs data intensive, in-memory processing using data and/or instructions organized in memory 309 or otherwise organized in the autonomous vehicle 303. For example, the controller 307 can perform a real-time analysis of a set of data collected and/or stored in the autonomous vehicle 303. In some embodiments, the set of data further includes collected or configuration update data obtained from server 301.

At least some embodiments of the systems and methods disclosed herein can be implemented using computer instructions executed by the controller 307, such as the firmware 304. In some instances, hardware circuits can be used to implement at least some of the functions of the firmware 304. The firmware 304 can be initially stored in non-volatile storage media, such as by using memory 309, or another non-volatile device, and loaded into the volatile DRAM 311 and/or the in-processor cache memory for execution by the controller 307. In one example, the firmware 104 can be configured to use the techniques discussed herein for controlling display or other devices of a vehicle as configured based on collected user data.

Figure 6:
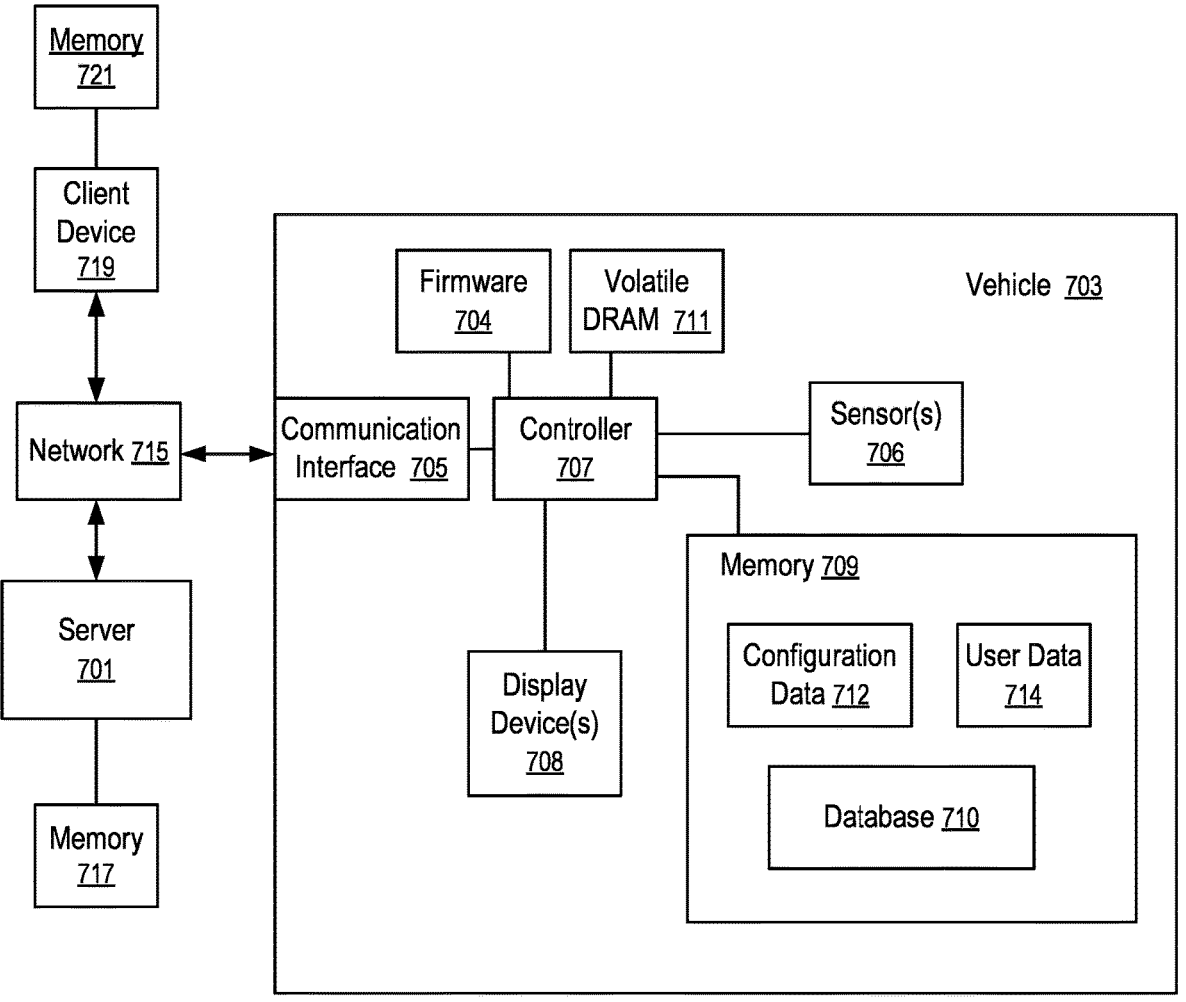
FIG. 6 shows a vehicle configured via a communication interface using a cloud service, according to one embodiment.

FIG. 6 shows a vehicle 703 configured via a communication interface using a cloud service, according to one embodiment. For example, vehicle 703 is configured in response to a determination by server 701 that vehicle 703 is failing to properly detect objects during navigation.

The vehicle 703 includes a communication interface 705 used to receive a configuration update, which is based on analysis of collected object data. For example, the update can be received from server 701 and/or client device 719. Communication amongst two or more of the vehicle 703, a server 701, and a client device 719 can be performed over a network 715 (e.g., a wireless network). This communication is performed using communication interface 705.

In one embodiment, the server 701 controls the loading of configuration data (e.g., based on analysis of collected data) of the new configuration into the memory 709 of the vehicle. Server 701 includes memory 717. In one embodiment, data associated with usage of vehicle 703 is stored in a memory 721 of client device 719.

A controller 707 controls one or more operations of the vehicle 703. For example, controller 707 controls user data 714 stored in memory 709. Controller 707 also controls loading of updated configuration data into memory 709 and/or other memory of the vehicle 703. Controller 707 also controls display of information on display device(s) 708. Sensor(s) 706 provide data regarding operation of the vehicle 703. At least a portion of this operational data can be communicated to the server 701 and/or the client device 719.

Memory 709 can further include, for example, configuration data 712 and/or database 710. Configuration data 712 can be, for example, data associated with operation of the vehicle 703 as provided by the server 701. The configuration data 712 can be, for example, based on collected and/or analyzed object data.

Database 710 can store, for example, configuration data for a user and/or data collected by sensors 706. Database 710 also can store, for example, navigational maps and/or other data provided by the server 701.

In one embodiment, when a vehicle is being operated, data regarding object detection activity of vehicle 703 can be communicated to server 701. This activity may include navigational and/or other operational aspects of the vehicle 703.

As illustrated in FIG. 6, controller 707 also may control the display of images on one or more display devices 708 (e.g., an alert to the user can be displayed in response to determining by server 701 and/or controller 707 that vehicle 703 is failing to properly detect objects). Display device 708 can be a liquid crystal display. The controller 707 may receive data collected by one or more sensors 706. The sensors 706 may be, for example, mounted in the vehicle 703. The sensors 706 may include, for example, a camera, a microphone, a motion detector, and/or a camera.

The sensors 706 may provide various types of data for collection and/or analysis by the controller 707. For example, the collected data may include image data from the camera and/or audio data from the microphone. In one embodiment, the image data includes images of one or more new objects encountered by vehicle 703 during travel.

In one embodiment, the controller 707 analyzes the collected data from the sensors 706. The analysis of the collected data includes providing some or all of the object data to server 701.

In one embodiment, memory 709 stores database 710, which may include data collected by sensors 706 and/or configuration data received by communication interface 705 from a computing device, such as, for example, server 701. For example, this communication may be used to wirelessly transmit collected data from the sensors 706 to the server 701. The data received by the vehicle may include configuration or other data used to configure control of navigation, display, or other devices by controller 707.

In FIG. 6, firmware 704 controls, for example, the operations of the controller 707. The controller 707 also can, for example, run the firmware 704 to perform operations responsive to communications from the server 701.

The vehicle 703 includes volatile Dynamic Random-Access Memory (DRAM) 711 for the storage of run-time data and instructions used by the controller 707 to improve the computation performance of the controller 707 and/or provide buffers for data transferred between the server 701 and memory 709. DRAM 711 is volatile.

Figure 7:
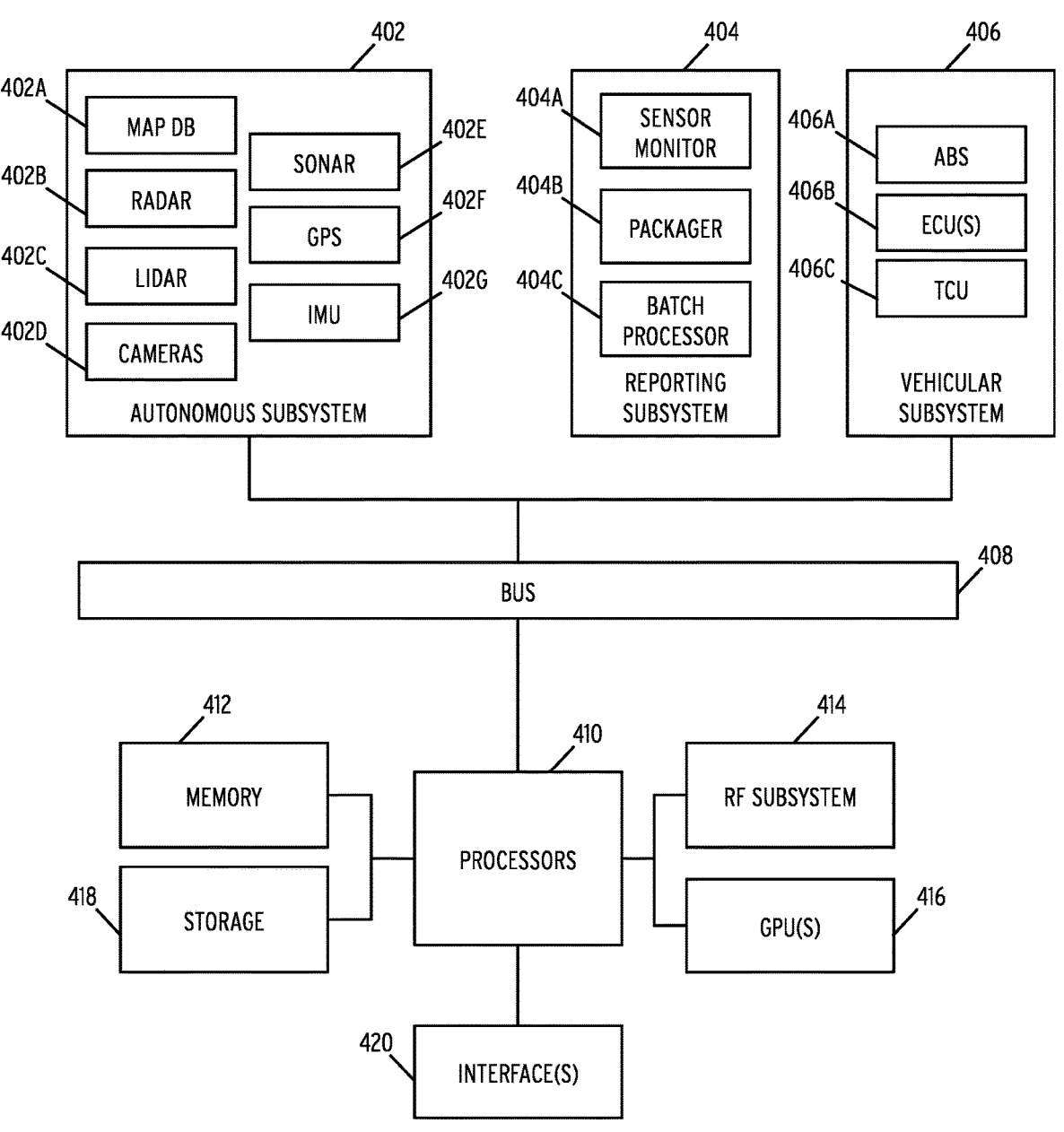
FIG. 7 is a block diagram of an autonomous vehicle including one or more various components and/or subsystems, each of which can be updated in various embodiments to configure the vehicle and/or perform other actions associated with the vehicle.

FIG. 7 is a block diagram of an autonomous vehicle including one or more various components and/or subsystems, each of which can be updated in various embodiments to configure the vehicle and/or perform other actions associated with the vehicle (e.g., configuration and/or other actions performed in response to a determination by server 101 that the vehicle is failing to properly detect objects). The system illustrated in FIG. 7 may be installed entirely within a vehicle.

The system includes an autonomous vehicle subsystem 402. In the illustrated embodiment, autonomous vehicle subsystem 402 includes map database 402A, radar devices 402B, Lidar devices 402C, digital cameras 402D, sonar devices 402E, GPS receivers 402F, and inertial measurement units 402G. Each of the components of autonomous vehicle subsystem 402 comprise standard components provided in most current autonomous vehicles. In one embodiment, map database 402A stores a plurality of high-definition three-dimensional maps used for routing and navigation. Radar devices 402B, Lidar devices 402C, digital cameras 402D, sonar devices 402E, GPS receivers 402F, and inertial measurement units 402G may comprise various respective devices installed at various positions throughout the autonomous vehicle as known in the art. For example, these devices may be installed along the perimeter of an autonomous vehicle to provide location awareness, collision avoidance, and other standard autonomous vehicle functionality.

Vehicular subsystem 406 is additionally included within the system. Vehicular subsystem 406 includes various anti-lock braking systems 406A, engine control units 406B, and transmission control units 406C. These components may be utilized to control the operation of the autonomous vehicle in response to the streaming data generated by autonomous vehicle subsystem 402A. The standard autonomous vehicle interactions between autonomous vehicle subsystem 402 and vehicular subsystem 406 are generally known in the art and are not described in detail herein.

The processing side of the system includes one or more processors 410, short-term memory 412, an RF system 414, graphics processing units (GPUs) 416, long-term storage 418 and one or more interfaces 420.

The one or more processors 410 may comprise central processing units, FPGAs, or any range of processing devices needed to support the operations of the autonomous vehicle. Memory 412 comprises DRAM or other suitable volatile RAM for temporary storage of data required by processors 410. RF system 414 may comprise a cellular transceiver and/or satellite transceiver. Long-term storage 418 may comprise one or more high-capacity solid-state drives (SSDs). In general, long-term storage 418 may be utilized to store, for example, high-definition maps, routing data, and any other data requiring permanent or semi-permanent storage. GPUs 416 may comprise one more high throughput GPU devices for processing data received from autonomous vehicle subsystem 402A. Finally, interfaces 420 may comprise various display units positioned within the autonomous vehicle (e.g., an in-dash screen).

The system additionally includes a reporting subsystem 404 which performs data collection (e.g., collection of data obtained from sensors of the vehicle that is used to drive the vehicle). The reporting subsystem 404 includes a sensor monitor 404A which is connected to bus 408 and records sensor data transmitted on the bus 408 as well as any log data transmitted on the bus. The reporting subsystem 404 may additionally include one or more endpoints to allow for system components to transmit log data directly to the reporting subsystem 404.

The reporting subsystem 404 additionally includes a packager 404B. In one embodiment, packager 404B retrieves the data from the sensor monitor 404A or endpoints and packages the raw data for transmission to a central system (illustrated in FIG. 8). In some embodiments, packager 404B may be configured to package data at periodic time intervals. Alternatively, or in conjunction with the foregoing, packager 404B may transmit data in real-time and may compress data to facilitate real-time communications with a central system.

The reporting subsystem 404 additionally includes a batch processor 404C. In one embodiment, the batch processor 404C is configured to perform any preprocessing on recorded data prior to transmittal. For example, batch processor 404C may perform compression operations on the data prior to packaging by packager 404B. In another embodiment, batch processor 404C may be configured to filter the recorded data to remove extraneous data prior to packaging or transmittal. In another embodiment, batch processor 404C may be configured to perform data cleaning on the recorded data to conform the raw data to a format suitable for further processing by the central system.

Each of the devices is connected via a bus 408. In one embodiment, the bus 408 may comprise a controller area network (CAN) bus. In some embodiments, other bus types may be used (e.g., a FlexRay or MOST bus). Additionally, each subsystem may include one or more additional busses to handle internal subsystem communications (e.g., LIN busses for lower bandwidth communications).

Figure 8:
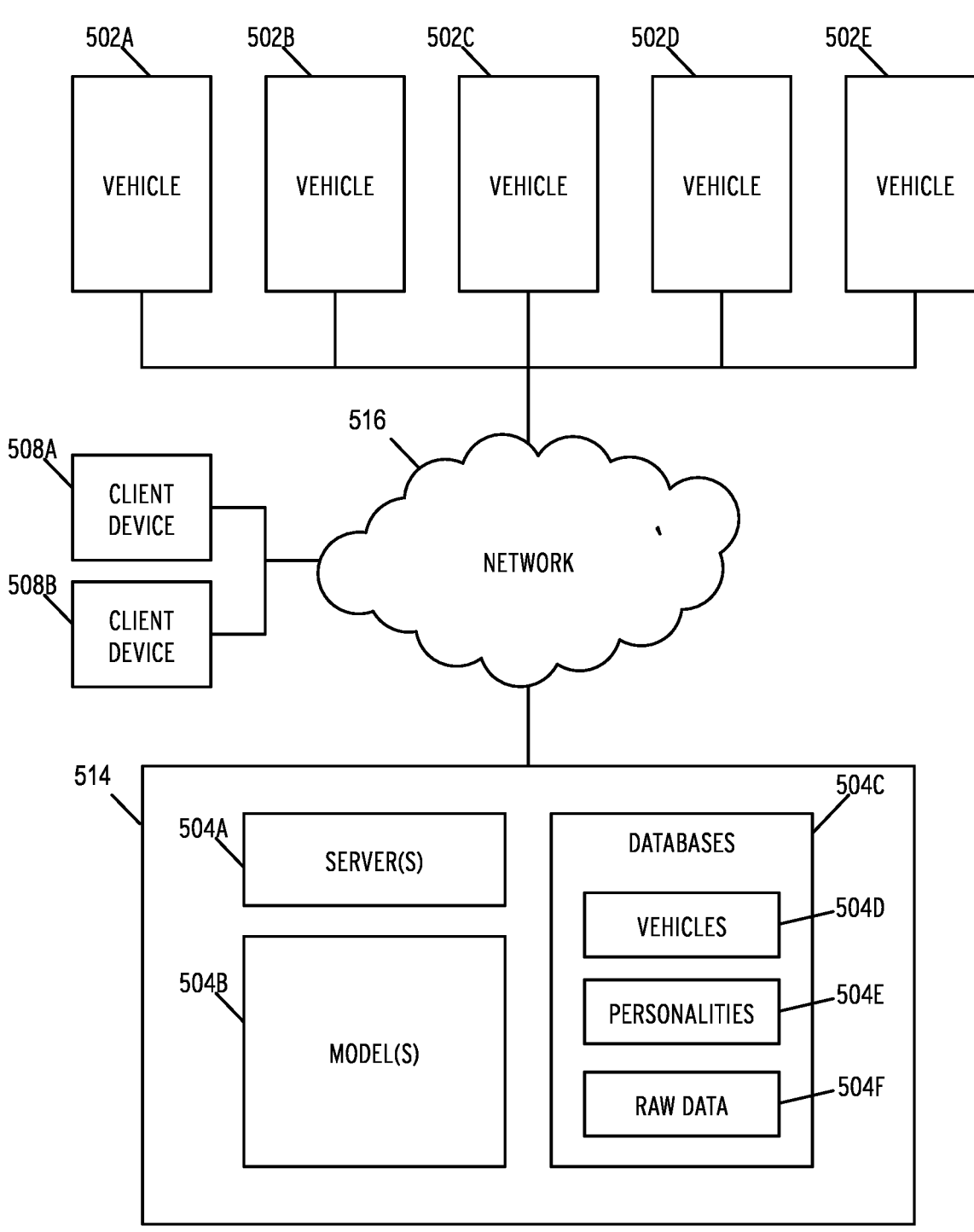
FIG. 8 is a block diagram of a centralized autonomous vehicle operations system, according to various embodiments.

FIG. 8 is a block diagram of a centralized autonomous vehicle operations system, according to various embodiments. As illustrated, the system includes a number of autonomous vehicles 502A-502E. In one embodiment, each autonomous vehicle may comprise an autonomous vehicle such as that depicted in FIG. 7. Each autonomous vehicle 502A-502E may communicate with a central system 514 via a network 516. In one embodiment, network 516 comprises a global network such as the Internet.

In one example, central system 514 is implemented using one or more of servers 101, 301, and/or 701. In one example, one or more of autonomous vehicles 502A-502E are autonomous vehicle 703.

The system additionally includes a plurality of client devices 508A, 508B. In the illustrated embodiment, client devices 508A, 508B may comprise any personal computing device (e.g., a laptop, tablet, mobile phone, etc.). Client devices 508A, 508B may issue requests for data from central system 514. In one embodiment, client devices 508A, 508B transmit requests for data to support mobile applications or web page data, as described previously.

In one embodiment, central system 514 includes a plurality of servers 504A. In one embodiment, servers 504A comprise a plurality of front end webservers configured to serve responses to client device 508A, 508B. The servers 504A may additionally include one or more application servers configured to perform various operations to support one or more vehicles.

In one embodiment, central system 514 additionally includes a plurality of models 504B. In one embodiment, models 504B may store one or more neural networks for classifying autonomous vehicle objects. The models 504B may additionally include models for predicting future events. In some embodiments the models 504B may store a combination of neural networks and other machine learning models. Central system 514 additionally includes one or more databases 504C. The databases 504C may include database record for vehicles 504D, personalities 504E, and raw data 504F. Raw data 504F may comprise an unstructured database for storing raw data received from sensors and logs as discussed previously.

The present disclosure includes methods and apparatuses which perform these methods, including data processing systems which perform these methods, and computer readable media containing instructions which when executed on data processing systems cause the systems to perform these methods.

Each of the server 101 and the computer 131 of a vehicle 111, . . . , or 113 can be implemented as one or more data processing systems. A typical data processing system may include includes an inter-connect (e.g., bus and system core logic), which interconnects a microprocessor(s) and memory. The microprocessor is typically coupled to cache memory.

The inter-connect interconnects the microprocessor(s) and the memory together and also interconnects them to input/output (I/O) device(s) via I/O controller(s). I/O devices may include a display device and/or peripheral devices, such as mice, keyboards, modems, network interfaces, printers, scanners, video cameras and other devices known in the art. In one embodiment, when the data processing system is a server system, some of the I/O devices, such as printers, scanners, mice, and/or keyboards, are optional.

The inter-connect can include one or more buses connected to one another through various bridges, controllers and/or adapters. In one embodiment the I/O controllers include a USB (Universal Serial Bus) adapter for controlling USB peripherals, and/or an IEEE-1394 bus adapter for controlling IEEE-1394 peripherals.

The memory may include one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In the present disclosure, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to non-transitory, recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system comprising:
at least one memory; and
at least one processor configured to:
    store, in the at least one memory, first data;
    receive second data collected by at least one sensor of a vehicle;
    determine a mismatch between the first data and the second data, wherein the mismatch is indicative of a failure to detect an object; and
    in response to determining the mismatch indicative of the failure to detect the object, change an operating configuration of the vehicle comprising activation of at least one vehicle system.

2. The system of claim 1, wherein the at least one processor is further configured to determine, based on the mismatch, that an aspect of the vehicle is not functioning properly.

3. The system of claim 1, wherein the first data is a map, the at least one processor further configured to:
    receive, from a plurality of vehicles, third data regarding objects detected by the plurality of vehicles; and
    generate, based on the third data, the map.

4. The system of claim 1, wherein changing the operating configuration comprises sending a communication to the vehicle, wherein the communication comprises an instruction to activate a braking system of the vehicle.

5. The system of claim 1, wherein the first data comprises objects and an associated location for each object.

6. The system of claim 1, wherein changing the operating configuration comprises deactivation of an autonomous driving mode.

7. The system of claim 1, wherein the second data is packaged as compressed data by the vehicle, and the compressed data is communicated by the vehicle to the system.

8. The system of claim 1, wherein the activation of the at least one vehicle system comprises activation of a braking system of the vehicle.

9. A system comprising:
at least one sensor of a vehicle;
at least one memory; and
at least one processor configured to:
    store, in the at least one memory, a map;
    collect, by the at least one sensor, first data;
    determine, based on comparing the first data to the map, a mismatch between the first data and the map, wherein the mismatch indicates a failure by the vehicle to detect an object; and
    in response to determining the mismatch, perform at least one action by the vehicle comprising a change to at least one vehicle system.

10. The system of claim 9, wherein the at least one processor is further configured to receive the map from a server.

11. The system of claim 9, wherein the map includes objects, each of the objects associated with a respective location.

12. The system of claim 9, wherein the at least one processor is further configured to:

receive second data regarding objects, each object detected by at least one of a plurality of vehicles other than the vehicle; and generate the map based on the second data.

13. The system of claim 9, wherein performing the at least one action further changes an operating status of the vehicle.

14. The system of claim 9, wherein the system further comprises a machine learning model, and determining the mismatch includes comparing the first data to output from the machine learning model.

15. The system of claim 9, wherein performing the at least one action further comprises changing a configuration of a navigation device of the vehicle.

16. The system of claim 9, wherein the change to the at least one vehicle system comprises a change of at least one of a window status, a seat position, or a driving style of the vehicle.

17. An apparatus comprising:

at least one memory; and at least one processor configured to:

store, in the at least one memory, first data;

receive second data indicative of first objects detected by a vehicle moving about a factory or warehouse;

determine, based on comparing the second data to the first data, a mismatch, wherein the mismatch is indicative of a failure by the vehicle to detect an object; and in response to determining the mismatch, perform an action associated with operation of the vehicle or send a communication to the vehicle, wherein the action or the communication is configured to cause the vehicle to come to a stop.

18. The apparatus of claim 17, wherein the first data is a map comprising second objects in the factory or warehouse.

19. The apparatus of claim 17, wherein the at least one processor is further configured to receive third data from one or more other vehicles moving about the factory or warehouse, the third data is indicative of second objects in the factory or warehouse, and the third data is used to generate the first data.

20. The system of claim 15, wherein the at least one action that changes the configuration of the navigation device of the vehicle comprises an activation of a backup navigation of the vehicle.

*    *    *    *    *